United States Patent [19]
Smith

[11] Patent Number: 6,118,679
[45] Date of Patent: Sep. 12, 2000

[54] CURRENT SHARING TRANSFORMER CIRCUIT FOR POWER CONVERTERS

[75] Inventor: David Anthony Smith, Cumnor Hill, United Kingdom

[73] Assignee: Astec International, Limited, The Hong Kong Special Administrative Region of the People's Republic of China

[21] Appl. No.: 09/300,001

[22] Filed: Apr. 26, 1999

[51] Int. Cl.[7] .................................................. H02M 7/08
[52] U.S. Cl. ............................................................ 363/70
[58] Field of Search .............................. 363/65, 67, 69, 363/70, 125, 126

[56] References Cited

U.S. PATENT DOCUMENTS

| | | |
|---|---|---|
| 4,106,087 | 8/1978 | Kawasaki .................................. 363/70 |
| 4,660,136 | 4/1987 | Montorefano ............................. 363/26 |
| 5,267,137 | 11/1993 | Goebel ..................................... 363/87 |
| 5,398,182 | 3/1995 | Crosby ..................................... 363/89 |
| 5,461,297 | 10/1995 | Crawford ................................... 320/1 |
| 5,933,338 | 8/1999 | Wallace ..................................... 363/61 |

*Primary Examiner*—Adolf Deneke Berhane
*Attorney, Agent, or Firm*—Coudert Brothers

[57] ABSTRACT

A transformer with a plurality of secondary windings with substantially similar coupling to the primary winding is used to facilitate synchronous rectification of the output by a rectifier attached to each secondary winding, reducing power losses compared to conventional power supplies with a single secondary winding coupled to a single rectifier. In a preferred embodiment, the transformer comprises at least two primary windings, with each primary winding coupled to at least two secondary windings.

18 Claims, 5 Drawing Sheets

| Switch :— |  |
| Primary Voltage :— |  |
| Primary Current :— |  |
| Rectified Sec. Voltage :— | |
| Secondary Currents :— |  |

CURRENT SHARING TRANSFORMER CIRCUIT FOR POWER CONVERTERS

FIELD OF THE INVENTION

The present invention relates to power supplies. More specifically, the present invention relates to a transformer design that facilitates an improvement in the performance of switch-mode power supplies.

BACKGROUND OF THE INVENTION

One common type of electrical power converter that produces a regulated output voltage is a switch mode power supply or a switched supply. Conventional switch mode power supplies commonly include a compact power transformer and one or more power switches for alternately coupling a DC voltage across a primary winding of the power transformer, thereby generating a series of voltage pulses across one or more secondary windings of the power transformer. These pulses are then rectified and filtered to provide one or more output DC voltages. The output voltage or voltages of the power converter are commonly regulated by controlling the relative amount of time that the power switch is on (i.e., the duty cycle).

There are several physical effects that tend to limit the maximum power and power conversion efficiency that can be achieved from a switch mode power supply in which the primary current to a transformer is switched. One limitation is that switch-mode power supplies include switching elements and rectifier elements whose resistance may limit their performance at high current levels. As is well known, resistive power losses increase as a function of $I^2R$, where I is the current flowing through the device and R is the electrical resistance of the device. In high current switch mode power supplies, the resistance of individual rectifiers and switches may lead to significant resistive losses. Moreover, the series resistance of a forward biased rectifier and the on-resistance of a transistor switch, such as a field effect transistor (FET), includes the resistance of bond wires and component leads, which can be significant.

The efficiency of a switch-mode power supply may also be limited by transformer winding losses. Compact switch mode power supplies typically operate at a high switching frequency. A high switching frequency permits the transformer size to be reduced while maintaining a desired induced voltage across the secondary winding. However, the efficiency of transformers degrades at high frequency because of increased resistive losses in the primary and secondary windings. Classical electromagnetic theory teaches that at high frequency the current distribution in a wire decreases exponentially with a characteristic length, or skin depth, from the surface. The skin depth varies inversely as the square root of the frequency and the conductivity of a metal. For example, at a frequency of 1 MHZ, the skin depth decreases to 66 μm, such that only a small annulus of a wire conducts. The effective cross-sectional area for current flow thus decreases dramatically at high frequency, leading to a corresponding increase in resistance of the primary and secondary windings.

Another limitation to high frequency operation of a low-profile transformer is leakage inductance. The leakage inductance occurs because not all of the magnetic flux generated by the primary winding is coupled by the core to the secondary winding. Some of the magnetic flux generated by the primary winding does not intersect the secondary winding but instead passes through the air space around the sides of the primary and secondary windings. In the equivalent circuit model of a transformer this leakage flux is modeled as a corresponding parasitic leakage inductance that must also be driven by the primary current but which does not couple power to the secondary winding. The transformer leakage inductance thus has the effect of impeding the flow of power from the primary winding to the secondary winding. If the leakage inductance is large, then a large primary winding current is required to provide a given load current. Also, for some switch-mode power supply topologies, a large leakage inductance may cause overvoltages in power switches at switch turn-on and turn-off. For example, it is well known that a transformer's leakage inductance may cause a voltage spike during the turnoff of a MOSFET switch used as the power switch in a forward converter power supply.

Still another effect that limits the potential efficiency of a switch mode power supply is switching losses. Non-ideal switches are commonly modeled as ideal switches with an additional impedance element that experiences a large switching current and voltage for a brief period of time at each switching event. As is well known in the art, switching losses during each switching event depend upon the power dissipation in the turn-on and turn-off phase of each switching event. Mathematically, the power dissipation per switching event can be calculated as the time interval of the product of the current and the voltage across the switch during one switching event. In an ideal switch, the switch turns on and off instantly such that the time integrated product of the current and voltage through the device is zero. However, in real FETs, there is a finite period of time when the product of the current and the voltage is non-negligible.

The time-averaged switching power loss is the product of the switching loss per switching event (i.e., the power loss per turn-on and turn-off event) multiplied by the switching frequency. The switching loss for a compact switch mode power supply operating at a high frequency (e.g., 100 kHz to 2 MHZ) tends to be large. Moreover, the switching losses are exacerbated at high current levels. For many FET switches used in switching power supplies, the switching loss per switching cycle depends upon the source-drain inductance of FET switches, according to the function $\frac{1}{2} L_{SD} I_{FET}^2$, where $L_{SD}$ is the source-drain terminal inductance of the FET, and $I_{FET}$ is the FET switching current.

One approach to improve the maximum current capability in a switch-mode power supply is to combine the outputs of two or more individual power supply circuits. FIG. 1 is circuit schematic of a prior art forward converter power supply. The general principles of forward converter supplies similar to that shown in FIG. 1 are well known. Input terminals 2, 4 are connected to an unregulated DC voltage source, $V_d$. A switch 6 controls the current to the primary winding 8 of transformer 10. Switch 6 may comprise any controllable switch, but typically comprises a field effect transistor (FET). The primary winding 8 induces a voltage in secondary winding 12 of transformer 10. A rectifying diode 14 is connected to one of the output terminals 13 of secondary winding 12. A filter 16 is coupled between the output of diode 14 and the ground terminal 11 of the secondary winding 12. The filter typically includes an inductor 20, freewheeling diode 18, and filter capacitor 22 to filter the current to a load 24. The principles of operation of forward converter circuits is well known. Assuming that transformer 10 is ideal, when switch 6 is on, diode 14 becomes forward biased and freewheeling diode 18 becomes reverse biased. Ignoring diode voltage drops, the voltage, $V_L$, across the inductor 20 is the induced voltage across the secondary winding 12 minus the load voltage. This can be expressed by the equation: $V_L=(N_2/N_1)V_d-V_o$, where $N_2/N_1$ is the turns ratio of the transformer, $V_d$ is the input voltage on the primary winding 8, and $V_o$ is the load voltage. As is well known, the voltage across an inductor depends upon the time rate of change of current through the inductor, or $V_L=LdI_L/dt$, where L is the inductance of the inductor and $I_L$ is the current through inductor 20. Consequently, when the switch 6 is turned on the current tends to ramp up linearly in inductor 20. When the switch 6 is off, there is no induced voltage across the secondary winding 12. Diode 14 is non-conducting. Current from inductor 20 flows through freewheeling diode 18 which becomes conducting as a result of a shift in sign of the voltage across inductor 20. When the switch 6 is off (and ignoring voltage drops across freewheeling diode 18) the voltage across the inductor 20 is equal in magnitude and opposite in sign to the load voltage, or $V_L$ $V_o$. The current across the inductor gradually ramps down when switch 6 is off. The ratio of the load voltage to the input voltage is $V_o/V_d=(N_2/N_1)$ D, where D is the duty ratio of switch 6.

As illustrated in FIG. 2, the power output of a switch mode power supply, such as a forward converter, can be improved by combining the current outputs of parallel power supply circuits. A first current source 30 comprises a first transformer 32. Current through the primary winding 34 of first transformer 32 is controlled by a first switch 36. The output of secondary winding 38 of first transformer 32 is coupled to rectifying diode 40. A second current source 44 comprises a second transformer 46. Current through primary winding 48 of second transformer 46 is controlled by a second switch 50. The output of secondary winding 52 of second transformer 46 is coupled to a rectifying diode 54. The currents $i_1$ and $i_2$ from first current source 30 and second current source 44 are combined in inductive filter element 58. An additional filter capacitor 60 is coupled across the output of inductor 58 to filter the voltage to a load 62. Each current source may have its own freewheeling diode 42, 56 or a common freewheeling diode may be used. The topology of the forward converter of FIG. 2 comprises essentially two individual forward converters similar to that shown in FIG. 1 driving a common inductor and filter capacitor. Typically, the two switches 36, 50 are sequenced to turn-on a halftime period apart from one another. This results in twice an many current pulses entering inductor 58 compared with a single current source. Operating the two circuits in parallel increases the maximum load current compared to the individual forward converter of FIG. 1. However, the parallel circuit power converter of FIG. 2 has several drawbacks. One significant drawback is that two separate transformers 32, 46 are required, which results in a comparatively expensive, heavy, and bulky power supply design. Another drawback is that additional circuit means are required to turn the two switches 36, 50 on a half-time period apart from one another.

Another approach to improve the performance of switch-mode power supplies is the use of parallel rectifiers and/or switching devices. A common practice in power electronics is to use a parallel arrangement of standard size power switching devices, such as bipolar transistors, field effect transistors (FETs), insulated gate field-effect transistors (IGFETs), and insulated gate bipolar transistors (IGBTs) instead of a single large power device, in order to handle the high currents and power dissipations that may otherwise exceed the safety ratings of a single power switching device. Also, it is a common practice in power electronics to use a parallel arrangement of diode rectifiers to handle high currents that would otherwise exceed the safety ratings of a single diode rectifier.

FIG. 3 shows a portion of a forward converter similar to that of FIG. 1 but with parallel switching devices 70, 72 and parallel diodes 14, 15. Parallel switches 70, 72 may reduce the DC switching resistance compared to a single switch 6. However, a significant drawback of the parallel circuit arrangement of FIG. 3 is that use of parallel switching devices 70, 72 may not substantially reduce the switching losses compared to an individual switching device 6. There is no guarantee of equal current sharing between the parallel power devices 70, 72. Typically, FET transistors are not perfectly matched in their DC current-voltage characteristics. Moreover, there are inductances and capacitances associated with a packaged transistor or diode. Consequently, when two switching devices 70, 72 are connected in parallel, one device typically draws a larger operating current than the other one. Also, one device typically switches on/off before the other one. When two or more parallel power devices are switched, the power device that turns on fastest will absorb all of the turn-on losses. Similarly, the switching device 70, 72 that turns off the slowest will absorb all of the turn-off losses. Consequently, the use of parallel switches 70, 72 may not result in a significant decrease in switching losses compared to a single switch 6.

The use of parallel diodes 14, 15 may also not provide the desired benefit. Equal current sharing of parallel diode rectifiers typically does not occur. Manufacturing variances, coupled with heating effects, tends to make one of the diodes 14, 15 have a significantly different turn-on voltage and series resistance than the other diode. One diode usually draws substantially more current than the other diode. However, each diode 14, 15 has a maximum current or power dissipation rating. The current entering inductor 20 must be limited so that the diode 14, 15 drawing the largest current does not exceed a safe rating. Consequently, the maximum current through parallel diodes 14, 15 must be limited to a value substantially less than that which would be possible if diodes 14, 15 equally shared the current.

Generally, previously known techniques to combine a plurality of conventional transformers, rectifiers, and power switches in parallel do not result in a switch mode power supply that is compact, inexpensive, efficient, has low switching losses and is capable of supplying a substantially increased load current.

What is desired is a new power supply design approach to improve the performance of high-frequency switch-mode power supplies.

SUMMARY OF THE INVENTION

The present invention generally comprises a transformer design specifically addressed to the problem of achieving low resistive losses and reduced switching losses in a compact switch mode power supply, such as a forward converter. More specifically, the present invention discloses a transformer design which provides a separate transformer secondary winding for each power rectifier in the power converter on the secondary side of the transformer. The transformer has equal leakage inductances in series with each secondary winding which equalizes the rectifier currents supplied to the load by each secondary winding.

Broadly stated, the transformer circuit according to the present invention includes a transformer magnetic core; a primary winding wound about the magnetic core; N secondary windings wound about the magnetic core and coupled to the primary winding with the same turns ratio, where N is an integer greater than one and each of the N secondary windings having a first terminal and a second terminal; N power rectifiers, one of the power rectifiers coupled to each of the N secondary windings to form N parallel circuits with a rectified current output, and an electrical connection node to combine the output current of the N parallel circuits into a load current; wherein the leakage inductance of each of the secondary winding is selected so that the load current is equally shared by the N parallel circuits.

One object of the present invention is a transformer design that permits the load current of a forward converter to be equally distributed through a plurality of power rectifiers in a plurality of parallel circuits. The characteristics of the secondary windings are preferably selected so that the power rectifiers of each parallel circuit draw the same current. In one embodiment, the power rectifiers are diode rectifiers. In another embodiment, the power rectifiers comprise synchronous rectifiers.

Another object of the present invention is a transformer design that reduces the primary winding switching losses. In one embodiment, a plurality of primary windings are wound on a magnetic core, with each primary winding preferably being coupled to the power supply with its own switch. Each primary winding is also coupled to at least two parallel secondary winding circuits.

DETAILED DESCRIPTION OF THE INVENTION

Figure 4:
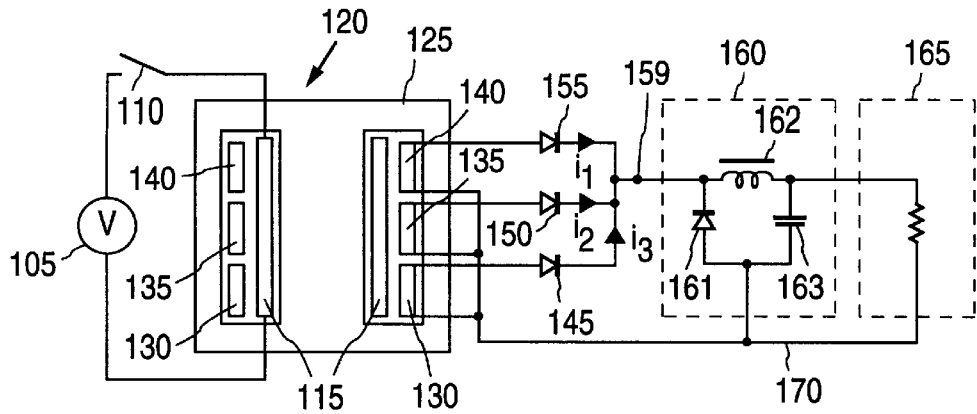
FIG. 4 is a circuit schematic showing a partial side view of an inventive transformer design that reduces secondary winding losses.

FIG. 4 is a circuit schematic of one embodiment of the present invention. A voltage source, such as a DC voltage source 105 is connected by a primary switch 110 to the primary winding 115 of transformer 120. Transformer 120, as shown in FIG. 4, has a transformer core 125 that may comprise two E-shaped core sections. However the transformer core 125 could comprise other transformer core designs known in the art, such as a U-shaped transformer core.

The transformer 120 shown in FIG. 4 corresponds to a partial side view of a transformer through the wound bobbin and through the E-shaped core sections 125 showing the core and a side view of the windings in the center of the core. As shown in FIG. 4, there are three separate secondary windings 130, 135, 140 magnetically coupled by core 125 to one primary winding 115. While the choice of three secondary windings 130, 135, 140 is a preferred design, more generally there could be any number of secondary windings greater than one. The turns ratio of each secondary winding relative to the primary winding is selected to be identical so that an N:1:1:1 transformer is formed.

Primary switch 110 is controlled by a pulsed signal source (not shown in FIG. 4). Pulsed signal sources suitable for the switch-mode power converter of FIG. 4 are well known in the art of power supply design. Primary switch 110 may comprise any switch used in switch mode power supplies. However switch 110 preferably is a field effect transistor (FET). Preferably, the diameter of the conductive elements (e.g., wires or foils) comprising the primary winding 115 and secondary windings 130, 135 and 140 is selected to reduce the high frequency skin resistance at high switching rates (e.g., between 100 kHz to 2 MHZ). Each secondary winding 130, 135, 140 has one output terminal connected to its own rectifier 145, 150, 155. The outputs of rectifiers 145, 150, 155 are connected in parallel to a filter element 160 at node 159 in order to form a power supply for a load 165. Node 159 is a common current node to which currents $i_1$, $I_2$, and $i_3$ from diodes 155, 150, 145 enter filter 160. The ground connection of each secondary winding 130, 135, 140 are connected to a common ground node 170 between the filter and load. The filter element 160, as indicated in FIG. 4, may comprise a common forward converter filter consisting of a freewheeling diode 161, inductor 162, and capacitor 163.

The physical principles of forward converter power supplies are generally well known in the context of forward converters with a single secondary winding. Some of these general principles may be applied to explain the operation of the present invention, which utilizes parallel secondary windings. There are two main modes of operation corresponding to the portion of the switching cycle when the primary switch 110 is closed and the portion of the switching cycle when primary switch 110 is open. During the portion of the switching cycle when primary switch 110 is open, no current flows in the primary winding 115, and there is no induced voltage across the secondary windings 130, 135, 140. Stored energy in inductor 162 supplies the load 165. The load current flows through a loop comprising freewheeling diode 161, inductor 162, and load 165. Capacitor 163 helps to smooth (filter) the load voltage as the stored energy in inductor 162 is gradually dissipated.

During the portion of the switching cycle when primary switch 110 is closed, the voltage source 105 is connected across the transformer primary winding 115. Transformer action results in a voltage across each of the secondary windings 130, 135, 140. The induced voltage on an individual secondary winding depends upon its turns ratio with the primary winding. The turns ratio is commonly defined as the ratio of the number of primary winding turns to the number of secondary winding turns but may also be understood as the ratio of the primary voltage to the induced secondary winding voltage. If the secondary windings 130, 135, 140 have an equal turns ratio then they will have equal induced voltages. Rectifiers 145, 150 155 are all forward biased, and each will conduct a part of the load current. Free-wheeling diode 161 is reverse biased, with no current flowing through it. Current from the three secondary windings 130, 135, 140 flows through rectifiers 145, 150, 155 into node 159 and hence to inductor 162 and load 165.

Figure 5:
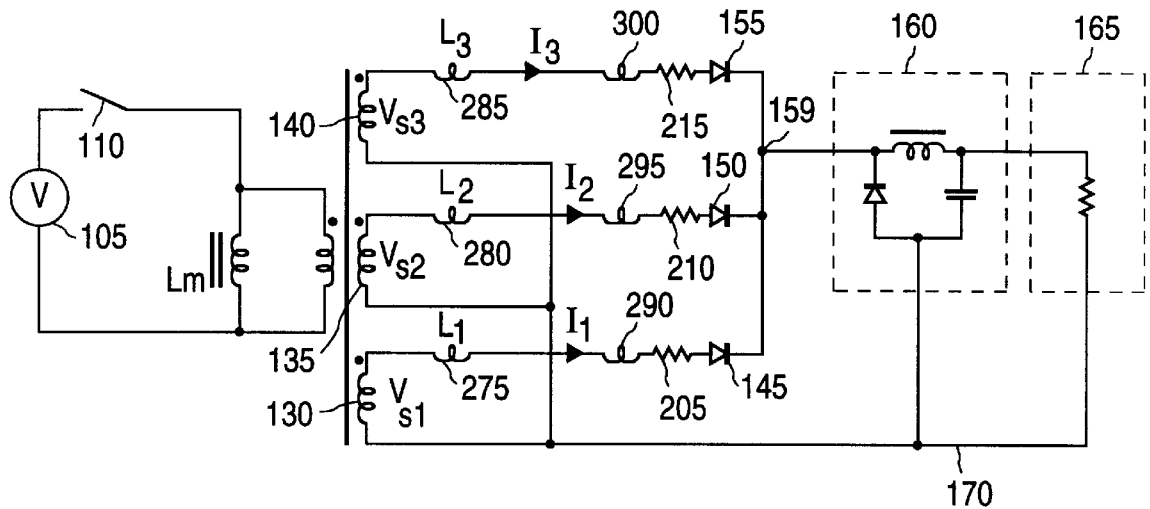
FIG. 5 is an equivalent electrical circuit for the circuit of FIG. 4.

FIG. 5 shows an equivalent circuit for the embodiment of FIG. 4. The transformer in FIG. 4 is replaced by an ideal transformer having the same N:1:1:1 turns ratio. The magnetizing inductance of the primary winding on the transformer core is shown separately as the inductor $L_m$. The leakage inductance between primary winding 115 and each of the three secondary windings 130, 135, 140 is modeled as three inductors 275, 280, 285 in series with three ideal secondary windings 130, 135, 140. Additionally, there are parasitic resistances associated with each secondary winding 130, 135, 140, the rectifiers 145, 150, 155, and resistances associated with the terminals of the secondary windings 130, 135, 140, printed circuit board (PCB) connecting traces, and rectifier leads and bond wires. The resistance of each secondary winding circuit and its associated parasitic resistances may be lumped together as a combined equivalent secondary winding resistance 205, 210, 215. The wiring inductance of each secondary circuit is modeled as a wiring inductance 290, 295, 300 element which lumps together the combined inductance of circuit traces, rectifier leads, and bond wires. In practice, the values of transformer leakage inductances 275, 280, 285 are higher than those of wiring inductances 290, 295, 300. A further simplification of the equivalent circuit model results if the leakage inductance and series inductance in each secondary winding circuit is replaced with a single equivalent leakage inductance for each of the three secondary circuits.

Figure 6:
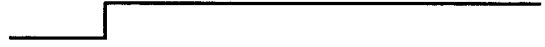
FIG. 6 is an illustrative plot of the voltages and current in the inventive transformer of FIG. 4 as a function of time after the switch is closed.
Figure 6:
Figure 6:
Figure 6:

FIG. 6 shows the voltages and currents that occur when switch 110 is closed. Prior to switch 110 closing, load current was flowing in the free wheeling diode 161, and the voltage at node 159 was slightly negative (e.g., about −0.4V). When switch 110 is closed, voltage source 105 is connected across the transformer primary winding 115, and an induced secondary voltage (which is the same for each secondary winding if they each have the same transformer turns ratio) appears across each of the three secondary windings 130, 135, 140 acting to produce a secondary current comprised of the combined current flowing in secondary windings 130, 135, 140. Secondary current starts to flow through inductors 275, 280, 285, 290, 295, 300 and rectifiers 145, 150, 155, into node 159. The current flow, $I_{sec}$ in each secondary winding 130, 135, 140 ramps up at a rate given by the equation $dI_{sec}/dt=V_{sec}/L_{Lsec}$, where $V_{sec}$ is the secondary winding voltage (which is equal to the primary winding voltage divided by the secondary winding turns ratio), and $L_{Lsec}$ is the leakage inductance between a primary winding 115 and a secondary winding 130, 135, 140 as seen and measured from the secondary winding. As current is ramping up in the three secondary windings 130, 135, 140, the current in the free wheeling diode 161 is ramping down. When the total of the three secondary currents equals the load current flowing in inductor 162, free wheeling diode 161 stops conducting, the voltage at node 159 rises to equal the secondary winding voltage, and the secondary winding current stops increasing.

It is desirable that each of the diodes 145, 150, 155 conduct substantially equal currents. This results in a desirable current sharing in which each diode 145, 150, 155 conducts a substantially equal fraction of the total secondary current. Current sharing is favored if each secondary winding circuit has about the same induced voltage and the same impedance. Consequently, it is desirable to select equal secondary turns ratios; utilize a similar layout of the three secondary circuits to achieve similar wiring inductances 290, 295, 300 and resistances 205, 210, 215; and to utilize a transformer design that has roughly equal leakage inductances between the primary winding 115 and each of the secondary windings 130, 135, 140.

The series resistance 205, 210, 215 of each secondary winding 130, 135, 140 typically will be comparable for secondary windings having the same turns ratio. Moreover, the resistance 205, 210, 215 of the secondary windings 130, 135, 140 is not the main limitation on the current in each secondary winding. Also, while there may be slight variances in the forward voltage of each of the diodes 145, 150, 155 (e.g., a ±5% manufacturing variation), the forward voltage of the diodes 145, 150, 155 is low compared to common switch mode load voltages. Consequently, the forward voltage of the diodes does not play a major role in determining the current through each secondary winding.

The inductance associated with each secondary winding 130, 135, 140 is the primary factor that determines the current through each secondary winding. This includes the self-inductance and leakage inductance. The wiring inductance 290, 295, 300 of each secondary winding 130, 135, 140 is typically small compared to the leakage inductance 275, 280, 285 for common switch-mode power supply applications.

The inventors have recognized that the main factor which determines whether the current is shared equally in diodes 145, 150, 155 is whether the leakage inductances 275, 280, 285 are substantially equal, since the current in each secondary circuit depends inversely on the leakage inductance associated with that circuit. Thus, current sharing depends on how well these leakage inductances are matched. The leakage inductance may be calculated for a particular transformer design using principles of electromagnetic theory that are well-known in the art. However, as indicated in FIG. 4, for common transformer core geometries substantially equal leakage inductances 275, 280, 285 may be achieved by designing the secondary windings 130, 135, 140 to have the same radial relationship to the primary winding 115 and transformer core, i.e., the same radial relationships so that by symmetry the flux coupling has substantially the same behavior.

Figure 7:
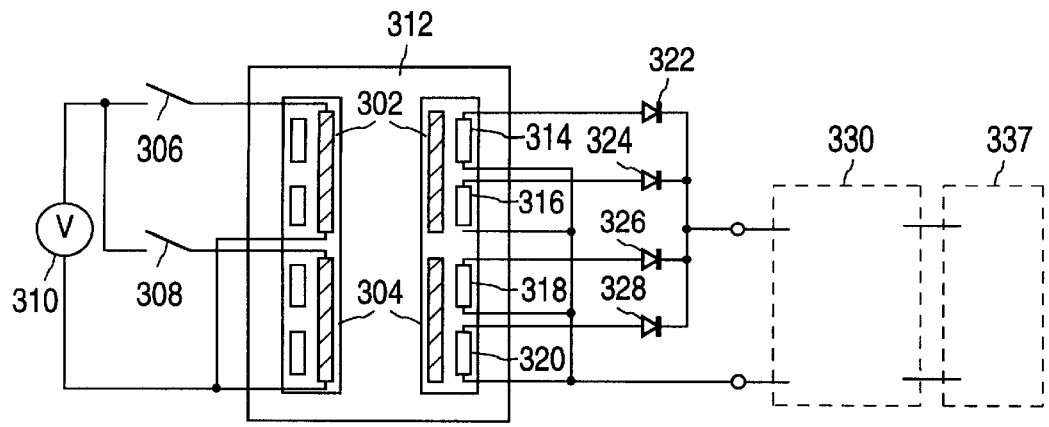
FIG. 7 is a circuit schematic showing a partial side view of a second embodiment of an inventive transformer design that reduces switching losses, primary winding loss, and secondary winding loss.
Figure 8:
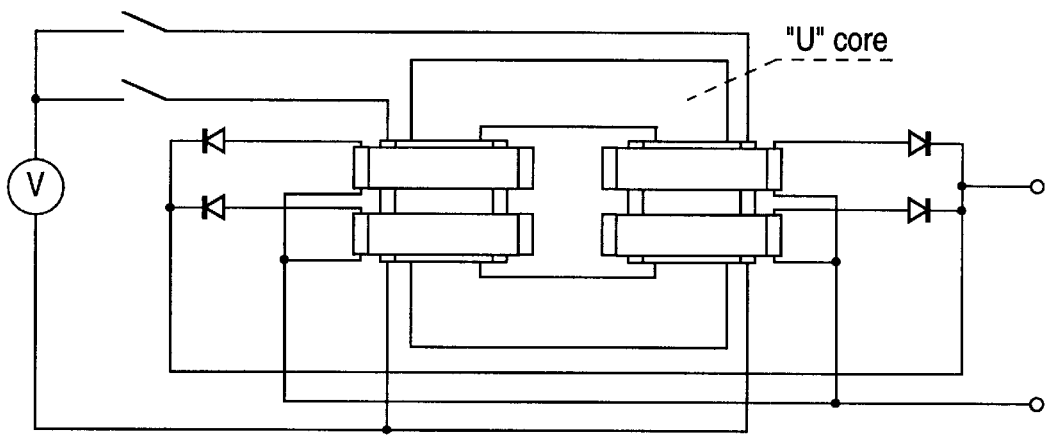
FIG. 8 is an alternate embodiment of the transformer of FIG. 7.

The inventive transformer may be further modified to simultaneously reduce switching losses and the resistive loss of the primary winding. As shown in FIG. 7, the primary winding can be split into a plurality of primary windings 302, 304. This reduces the effective resistance of the primary winding series losses compared to a single primary winding. As shown in FIG. 7 each primary winding 302, 304 is preferably connected by its own separate switch 306, 308 to the input power source 310. This reduces the effective switching losses compared to connecting the primary windings 302, 304 to a common switch. Each switch 306, 308 is preferably driven in phase by a common control signal source. Switches 306, 308 are also preferably switches that have a low switching loss, such as FET switches. The control signal source may be any signal source circuit used in switch-mode power supplies. The embodiment of FIG. 7 is a side-sectional view around two E-shaped transformer core sections 312. However, the transformer of FIG. 7 may also be formed on other transformer core shapes, as indicated in FIG. 8. FIG. 8 shows an embodiment similar to FIG. 7 except that the transformer windings are wound upon a U-shaped core.

As indicated in FIG. 7, the first primary winding 302 is strongly magnetically coupled to a plurality of secondary windings 314, 316. The second primary winding 304 is strongly magnetically coupled to a plurality of secondary windings 318, 320. Preferably, the first primary winding 302 is only weakly coupled to secondary windings 318, 320. Preferably, the second primary winding 304 is only weakly coupled to secondary windings 314, 316. Each secondary winding 314, 316, 318, 320 is coupled by respective diodes 322, 324, 326, 328 to filter 330 which drives load 332. Each primary winding 302, 304 preferably forms a transformer with a turns ratio of N:1:1 with its associated secondary windings 314, 316, 318, 320. Also, each primary winding 302, 304 preferably has the same number of turns.

Figure 9:
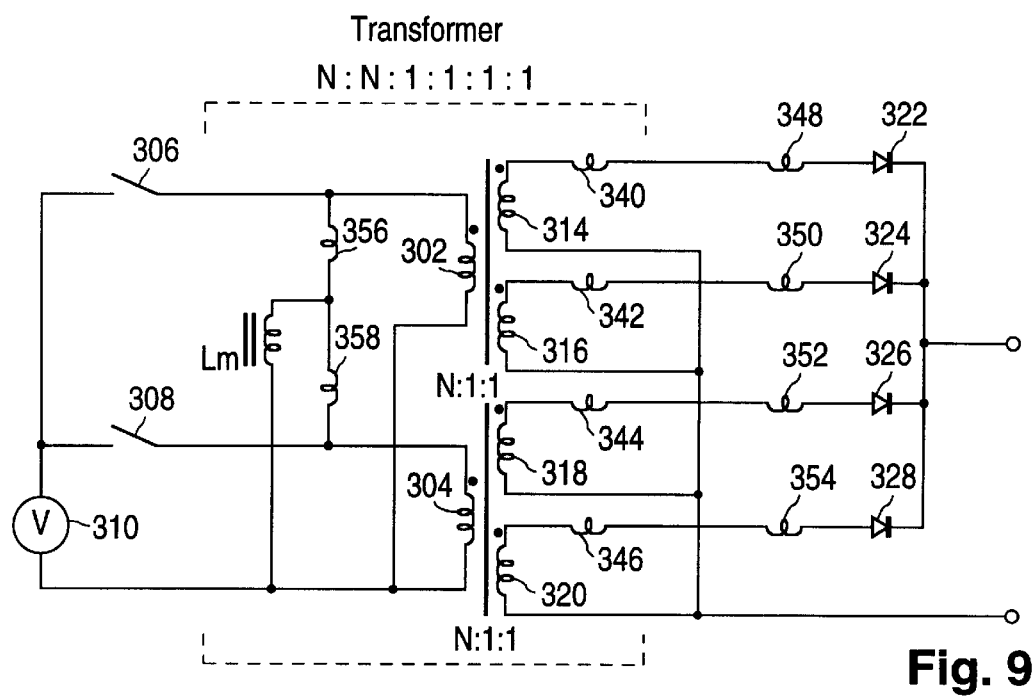
FIG. 9 is an equivalent circuit for the transformer of FIG. 7.

FIG. 9 shows an equivalent circuit for the transformer circuit of FIG. 7. The first primary winding 302 forms a first N:1:1 transformer with secondary windings 314, 316. The second primary winding 304 forms a second N:1:1 transformer with secondary windings 318, 320. Each secondary winding has an associated leakage inductance 340, 342, 344, 346 and secondary circuit wiring inductance 348, 350, 352, 354. In the equivalent circuit model, inductances 356, 358 weakly couple primary windings 302, 304.

There are many advantages provided by the present invention. One advantage is that the winding losses in the secondary windings are reduced compared to a conventional forward converter. As is well known, the power loss of a resistor is: $I_R^2 R$, where R is the electrical resistance of the resistor and $I_R$ is the current flowing through the resistor. In the embodiment of FIG. 4, the current in each secondary winding 130, 135, 140 is one-third that of a conventional forward converter with the same output current. Consequently, the cumulative resistive losses of the secondary windings are about a factor of three lower than a conventional forward converter providing the same current.

Figure 1:
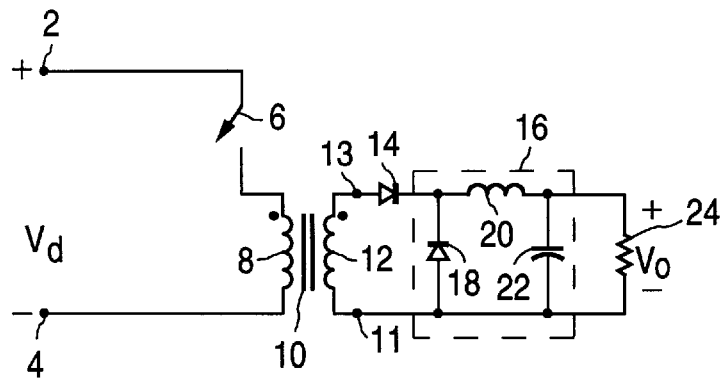
FIG. 1 is a circuit schematic of a prior art forward converter power supply.
Figure 2:
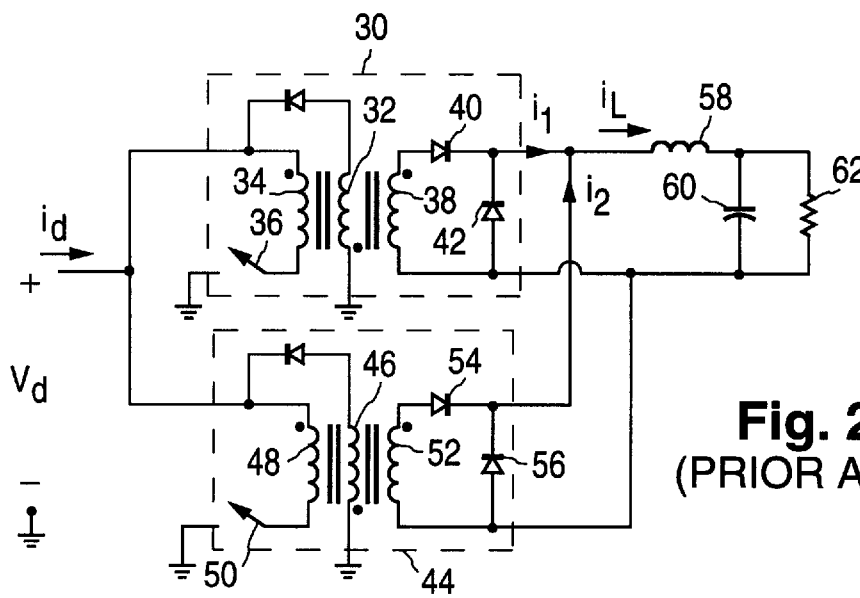
FIG. 2 is a circuit schematic of a prior art parallel forward converter power supply.
Figure 3:
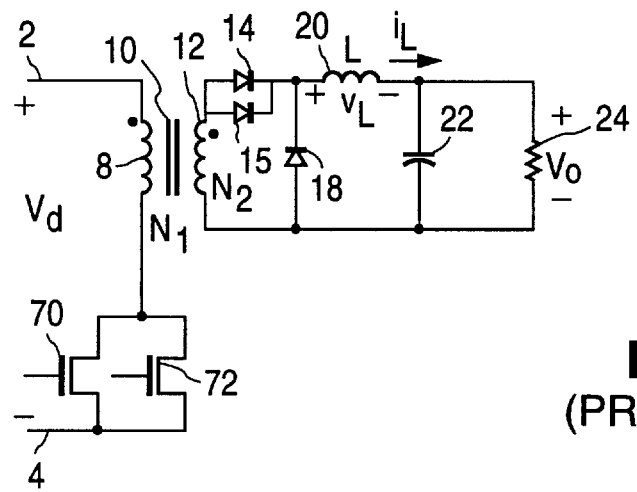
FIG. 3 is a circuit schematic of a prior art forward converter power supply with parallel switches.

The current sharing provided by the inventive transformer circuit permits several (i.e., two or more) diodes to substantially equally share in providing the required load current. Diodes 145, 150, and 155 may therefore be selected to have a substantially lower maximum current and thermal dissipation limit compared to a single diode intended to carry all of the current, as in the conventional forward converter of FIG. 1. This may result in significant cost savings, such as in cases where rectifiers designed to handle high currents are expensive and/or unavailable in large commercial quantities. Moreover, the resistive losses associated with rectifiers 145, 150, 155 carrying substantially equal currents may be significantly less than a single rectifier carrying their combined current. In the embodiment of FIG. 7, the parallel primary transformer windings results in a factor of two reduction in the resistance of the primary winding.

The embodiment of FIG. 7 has the additional advantages of reduced switching losses and reduced primary winding losses. For the case of a MOSFET switch operating at high frequency, part of the switching loss is associated with the inductance of the MOSFET. This inductive loss increases as the square of the current. In the embodiment of FIG. 7, the current in each switch 306, 308 is reduced by a factor of two compared to the case of both primary windings being driven by a common switch. Consequently, the inductive component of switching losses is reduced by a factor of two. Also, switching losses may be further reduced in the embodiment of FIG. 7 because it is easier to design switches with a fast response at lower current levels. In many cases a single switch, such as a MOSFET capable of switching 20 amperes of current, cannot switch as fast as two switches 306, 308 carrying half the current, such as two MOSFET switches 306, 308 carrying 10 amperes of current each. Switching speed at high currents may also be limited by transistor gain (which is current dependent) and/or by the inductance of the gate terminal lead and bond wire. Generally, using two primary windings 302, 304, each with a separate switch 306, 308 facilitates a circuit designer to design a circuit with reduced switching losses compared to conventional forward converter circuit designs.

While the embodiments of FIGS. 4 and 7 are for forward converters using diode rectifiers, the approach of the present invention may also be applied to a forward converter utilizing synchronous switching. A conventional diode rectifier is modeled, in its conducting state, as having a series resistance and turn-on voltage. There is a switching loss associated with the series resistance and turn-on voltage of conventional diode rectifiers used in forward converters. This switching loss can be significant, particular for a high-frequency forward converter. One attempted prior art solution to the problem of the switching loss is to replace the diode rectifiers of a forward converter with a MOSFET transistor configured to act as a so-called "synchronous rectifier." A synchronous rectifier is a MOSFET whose gate voltage is driven so that the MOSFET transistor performs a rectification function but at a higher efficiency than conventional diode rectifiers. The timing of the turn-on and turn-off of a synchronous rectifier is typically selected to minimize the switching losses of the synchronous rectifier consistent with other circuit objectives.

Figure 10:
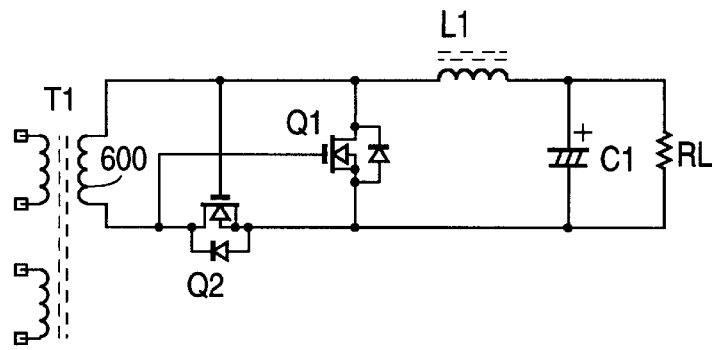
FIG. 10 is a circuit schematic of a prior art forward converter with synchronous rectifiers.

FIG. 10 shows a prior art forward converter with synchronous rectification. MOSFET transistors Q1 and Q2 have their gates coupled to opposite terminals of secondary winding 600 of transformer T1. MOSFET transistors Q1 and Q2 perform the same function as the diodes 14, 18 of FIG. 1 but have a lower switching loss in their on-state. However, it is not possible to achieve parallel synchronous rectification merely be adding one or more additional MOSFET transistors (e.g., Q3 and Q4) in parallel with transistors Q1 and Q2. One reason why parallel synchronous rectifiers cannot be advantageously utilized in the prior art circuit of FIG. 10 is because even slight differences in the turn-on and turn-off behavior of parallel MOSFET transistors alters the voltage relationships on at least one of the parallel MOSFETs so that true current sharing and lossless turn-on and turn-off (i.e., true synchronous rectification) is difficult to achieve for parallel MOSFET rectifiers.

Figure 11:
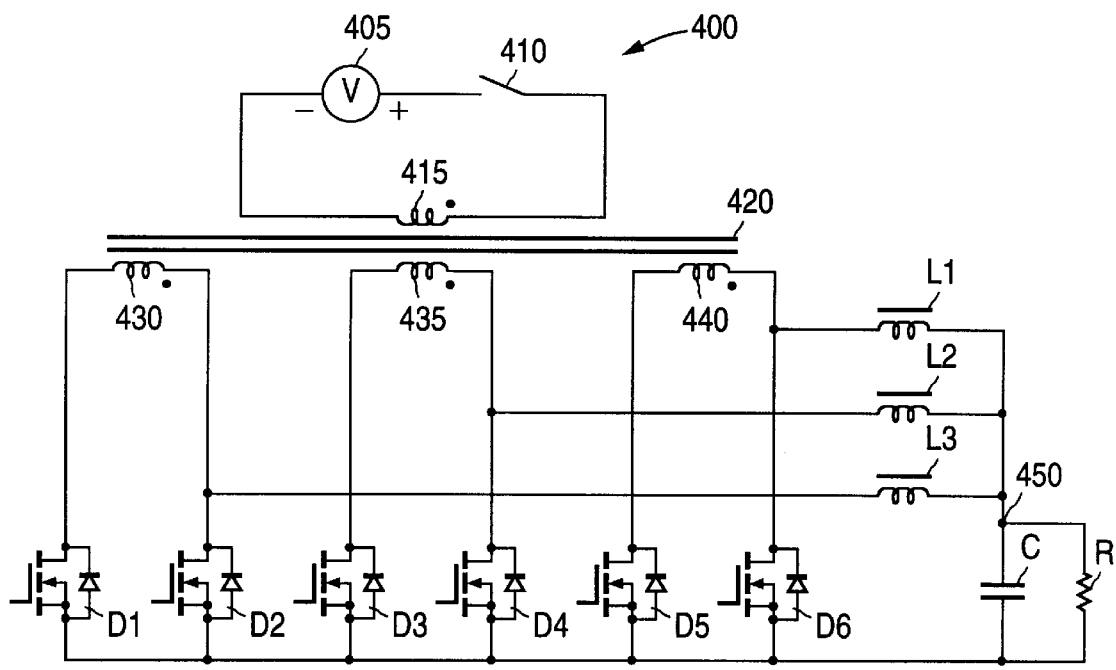
FIG. 11 is a circuit schematic of an embodiment of the present invention utilizing synchronous rectifiers.

The principles of the present invention may be applied to achieving current sharing in converters utilizing synchronous rectifiers. Generally speaking, a forward converter of the present invention may comprise a plurality of secondary windings, coupled to a primary winding by the same turns ratio and having the same leakage inductance, wherein each secondary winding utilizes synchronous rectifiers so that a plurality of parallel forward converters are formed which share the total load current. FIG. 11 is an embodiment of an inventive forward converter 400 with MOSFETs connected as synchronous rectifiers D1, D2, D3, D4, D5, and D6. The synchronous rectifiers of each parallel circuit may be configured to achieve the function of any combination of diode rectifiers used in conventional forward converters, but with higher efficiency. As shown in FIG. 11, a primary winding 415 of transformer 420 is coupled to a voltage source 405 by switch 410. Each secondary winding 430, 435, and 440 is connected to two rectifiers D1, D2, D3, D4, D5, and D6, with the polarity of the rectifiers selected and one output choke L1, L2, L3. Secondary winding 430, rectifiers D1, D2, and output choke L3 comprise a first forward converter output circuit. Secondary winding 435, rectifiers D3, D4, and output choke L2 comprise a second forward converter output. Secondary winding 440, rectifiers D5, D6 and output choke L1 comprise a third forward converter output circuit. The three parallel forward converter circuits are connected to node 450. The gate voltages of synchronous rectifiers D1, D2, D3, D4, D5, and D6 can be controlled using any conventional control circuit which drives the gates of the MOSFETs comprising rectifiers D1, D2, D3, D4, D5, and D6 so that each of the three parallel circuits functions, in combination with its corresponding inductor, to form three parallel forward converter circuits. For example, one of the synchronous rectifiers in each parallel circuit, such as rectifiers D2, D4, D6 may be controlled to perform the same function as a freewheeling rectifier whereas the other rectifier, such as rectifiers D1, D2, D3 may be controlled to perform the function of a conventional power rectifier.

The synchronous rectifiers D1, D2, D3, D4, D5, and D6 of FIG. 11 preferably comprise field effect transistors (FETs) with their source terminals connected to ground. The on-resistance of a FET used as a synchronous rectifier may be as low as 10 m$\Omega$ and be capable of efficiently switching 10 A. The leakage inductance of each secondary winding 430, 435, 440 will, in a similar manner to the diode embodiment of FIG. 4, tend to result in substantially equal currents flowing through the power MOSFET rectifiers of each parallel circuit. This permits the embodiment of FIG. 11 to achieve the benefits of synchronous rectification in which two or more power FET rectifiers share the load current substantially equally. This may permit FETs with a lower maximum current to be used than in a conventional forward converter to provide the same load current. Since a single large current FET often has a larger package inductance than a FET with a lower current rating, the embodiment of FIG. 11 may also result in a reduction in switching losses compared to a conventional forward converter using a FET rectifier.

Figure 12:
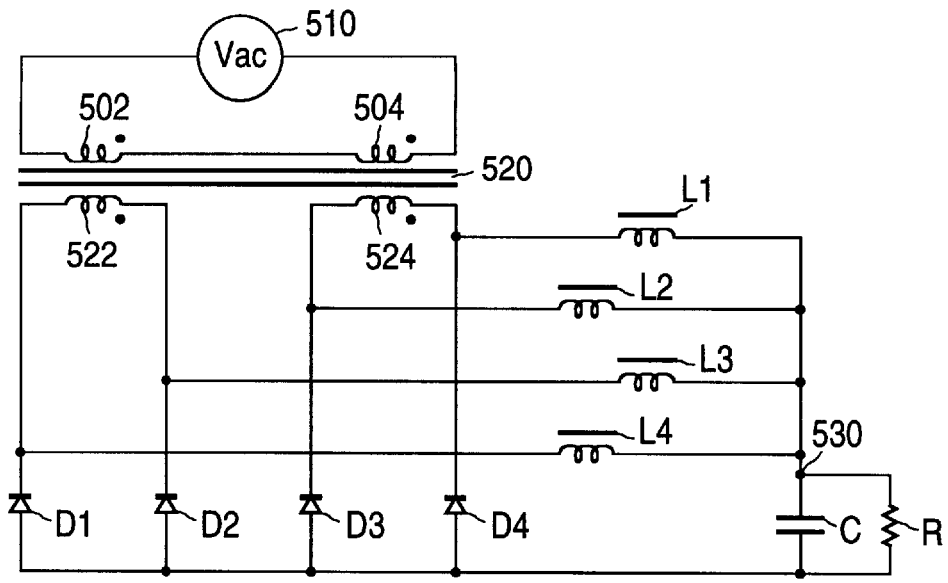
FIG. 12 is a circuit schematic of an embodiment of the present invention particularly well-suited for high-frequency applications.
Figure 13:
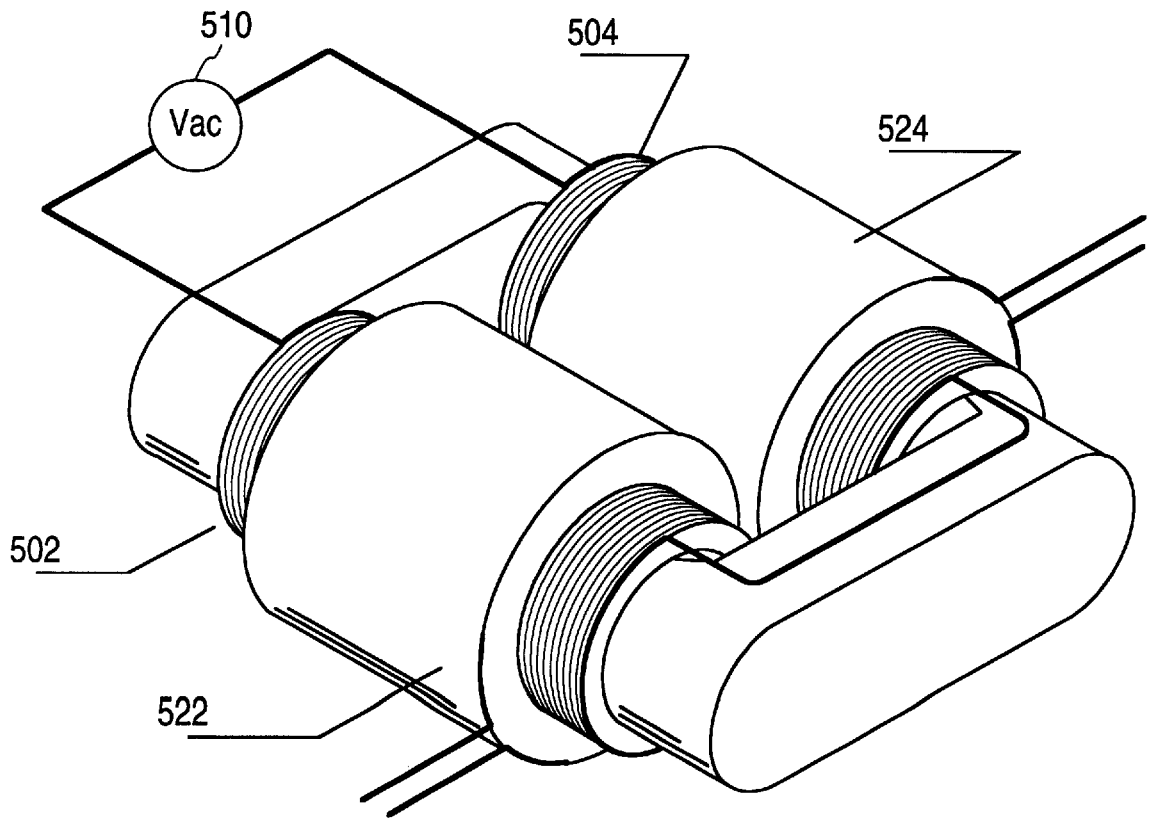
FIG. 13 is a perspective view of an assembled transformer with a U-shaped core for use in the embodiment of FIG. 12.

The present invention may also be utilized for high-frequency converters (i.e., greater than about one MHZ). FIG. 12 shows a transformer 520 with two primary windings 502, 504 connected in series. An AC voltage source 510 (or an AC current source) drives primary windings 502, 504. Each primary winding is coupled to a corresponding secondary winding 522, 524. A first secondary winding circuit includes secondary winding 522 and rectifiers D1 and D2. A second secondary winding circuit includes secondary winding 524 and rectifiers D3 and D4. Inductors L1, L2, L3, and L4 have the same inductance. As in other embodiments of the present invention, the leakage inductance of secondary windings 522, 524 acts to produce substantially equal current sharing of those rectifiers D1, D2, D3, D4 which are in a conductive on-state. FIG. 13 shows a preferred transformer with a U-shaped core for the embodiment of FIG. 12 with the primary windings 502, 504 connected in series.

While the present invention has been discussed in regards to forward converters, a variety of power supply designs utilize a transformer with diodes coupling the output of the secondary winding to a filter element. The inventive transformer design may also be beneficially used to drive a variety of power supplies with filter elements different from a forward converter.

The present invention has also been described with regards to specific examples regarding the number of primary windings and associated secondary windings for each primary winding. However, more generally, the present invention may be generalized to include any integer number, M, of primary windings where M is an integer equal to or greater than one (e.g., 1, 2, 3). The number of secondary windings per primary winding may be an integer number, X, equal to or greater than two (e.g., 2, 3, 4). The total number, N, of secondary windings is thus N=MX.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A current sharing transformer circuit for a switch mode power converter, comprising:

a transformer magnetic core;

a primary winding magnetically coupled to said magnetic core;

N secondary windings magnetically coupled to said magnetic core, each of said N secondary windings coupled to said primary winding with the same turns ratio, where N is an integer greater than one and wherein each of said N secondary windings has a leakage inductance;

N power rectifiers, one of said power rectifiers coupled to each of said N secondary windings to form N parallel circuits each with a rectified current output, the rectified current output of each of said N parallel circuits being a function of the leakage inductance of the parallel circuit; and an electrical connection node connecting the output current of each of said N parallel circuits into a load current;

wherein the leakage inductance of each of said secondary windings is selected so that the load current is equally shared by said N parallel circuits.

2. The transformer circuit of claim 1, wherein said power rectifiers are MOSFET transistors configured to operate as synchronous rectifiers.

3. The transformer circuit of claim 1, further comprising:

a second power rectifier connected to each said parallel circuit so that each of said N parallel circuits includes at least two power rectifiers;

at least one inductor connected to each said parallel circuit;

wherein said rectifiers and said inductors are connected as N parallel forward converter circuits.

4. The transformer circuit of claim 3, wherein said power rectifiers comprise synchronous rectifiers.

5. The transformer circuit of claim 1, further comprising a filter coupled to said electrical connection node.

6. The transformer circuit of claim 5, wherein said filter comprises a freewheeling diode coupled between said common current node and said ground node, an inductor with a first terminal coupled to said common current node and a second load terminal, and a capacitor coupled between said load terminal of said inductor and said ground node.

7. The transformer circuit of claim 6, further comprising a controllable switch coupling said primary winding of said transformer to a power supply.

8. The transformer circuit of claim 1, further comprising:

a second rectifier connected to each said parallel circuit so that each of said N parallel circuits includes a freewheeling rectifier.

9. A transformer circuit for a switch mode power converter, comprising:

a transformer magnetic core;

a primary winding magnetically coupled to said magnetic core;

at least two secondary windings magnetically coupled to said magnetic core, each said secondary winding having an input terminal and an output terminal;

one power rectifier for each said secondary winding, each said power rectifier electrically connecting each said output terminal of each said secondary winding to a common current node; and electrical interconnections between the input terminals of each said secondary windings to a common current node;

wherein each of said secondary windings is magnetically coupled to said primary winding with substantially the same turns ratio and each of said secondary windings has substantially the same leakage inductance so that each of said power rectifiers of said transformer circuit provides substantially the same current to said common current node.

10. The transformer circuit of claim 9, further comprising a filter coupled between said common current node and said common ground.

11. The transformer circuit of claim 10, wherein said filter comprises a freewheeling diode coupled between said common current node and said ground node, an inductor with a first terminal coupled to said common current node and a second load terminal, and a capacitor coupled between said load terminal of said inductor and said ground node.

12. The transformer circuit of claim 10, further comprising a controllable switch coupling said primary winding of said transformer to a power supply.

13. The transformer circuit of claim 10, wherein said power rectifiers comprise synchronous rectifiers.

14. A transformer circuit for a switch mode power converter, comprising:

a transformer magnetic core;

at least two primary windings magnetically coupled to said magnetic core;

one switch for each of said primary windings, each said switch electrically coupling each said primary winding to an input power source;

at least two secondary windings for each said primary winding, each of said at least two secondary windings magnetically coupled to one of said primary windings by said magnetic core, each of said secondary windings having an input terminal and an output terminal;

one power rectifier for each said secondary winding, said power rectifier electrically coupling said output terminal of each said secondary winding to a common current node; and an electrical interconnection between the input terminals of each said secondary winding to a common ground node;

wherein each said secondary winding has substantially the same transformer turns ratio; and wherein each said secondary winding has substantially the same leakage inductance.

15. The transformer circuit of claim 14, further comprising a filter coupled between said common current node and said common ground.

16. The transformer circuit of claim 15, wherein said filter comprises a freewheeling diode coupled between said common current node and said ground node, an inductor with a first terminal coupled to said common current node and a second load terminal, and a capacitor coupled between said load terminal of said inductor and said ground node.

17. A forward converter circuit, comprising:

transformer means for forming a plurality of secondary windings with equal turns ratio and leakage inductance;

rectification means for forming a plurality of parallel forward converter circuits from said secondary windings, wherein each of said parallel forward converter circuits has a secondary winding coupled to at least one rectifier;

filter means for filtering the output of said plurality of parallel forward converter circuits; and means for combining the output current of said parallel forward converter circuits to a common node;

wherein the transformer turns ratio and leakage inductance of each of said plurality of parallel forward converter circuits is selected to be about the same, thereby producing current sharing of a load current.

18. A method of designing a current sharing forward converter circuit, comprising the steps of:

a) providing a plurality of power rectifiers with the same nominal characteristics;

b) providing a transformer with a plurality of secondary windings with each secondary winding having the same turns ratio with respect to a primary winding of the transformer;

c) coupling at least one of the power rectifiers to each secondary winding to form a plurality of parallel forward converter circuits; and d) connecting the output of each of the plurality of parallel forward converter circuits into a common load current;

wherein the output current of each forward converter circuit is a function of the leakage inductance of the parallel forward converter circuit and the leakage inductance is selected so that current sharing occurs regardless of manufacturing variances in the characteristics of said power rectifiers.

\* \* \* \* \*